United States Patent [19]

Laitar

[11] Patent Number: 4,862,948
[45] Date of Patent: Sep. 5, 1989

[54] PHENOLIC RESIN ADHESIVE PASTES, ASSEMBLIES PREPARED THEREFROM, AND PROCESSES FOR PREPARING CAST METAL ARTICLES USING THESE PASTES

[75] Inventor: Robert A. Laitar, Woodridge, Ill.

[73] Assignee: Borden, Inc., Columbus, Ohio

[21] Appl. No.: 159,761

[22] Filed: Feb. 24, 1988

[51] Int. Cl.$^4$ ................................................ B22C 1/22
[52] U.S. Cl. .................................... 164/526; 164/137; 164/520; 164/349; 164/364; 523/145; 523/147; 524/596; 525/480; 525/508
[58] Field of Search ............... 164/525, 526, 527, 520, 164/137, 349, 364, 365, 368; 523/145, 147; 524/596; 525/480, 508

[56] References Cited

U.S. PATENT DOCUMENTS

| | | | |
|---|---|---|---|
| 3,243,397 | 3/1966 | Herkimer et al. | 523/145 |
| 3,268,460 | 8/1966 | Miller et al. | 524/596 |
| 3,634,276 | 1/1972 | Kreibich et al. | 524/14 |
| 3,637,547 | 1/1972 | Orth | 524/13 |
| 3,666,703 | 5/1972 | Murata et al. | 164/527 |
| 3,793,284 | 2/1974 | Klaudinyi et al. | 523/139 |
| 4,026,848 | 5/1977 | Harding et al. | 524/28 |
| 4,216,133 | 8/1980 | Johnson et al. | 523/145 |
| 4,239,665 | 12/1980 | Richards et al. | 523/147 |
| 4,246,144 | 1/1981 | Girgis | 524/430 |
| 4,252,711 | 2/1981 | Hartman et al. | 524/447 |
| 4,404,324 | 9/1983 | Fock et al. | 525/123 |
| 4,426,467 | 1/1984 | Quist et al. | 523/145 |
| 4,468,359 | 8/1984 | Lemon et al. | 523/145 |
| 4,474,904 | 10/1984 | Lemon et al. | 523/146 |
| 4,501,836 | 2/1985 | Nakamura et al. | 523/147 |
| 4,546,124 | 10/1985 | Laitar et al. | 523/143 |
| 4,692,479 | 9/1987 | Schneider et al. | 523/143 |
| 4,724,892 | 2/1988 | Schneider et al. | 164/349 |

FOREIGN PATENT DOCUMENTS

| | | | |
|---|---|---|---|
| 109199 | 11/1927 | Austria . | |
| 0027333 | 4/1981 | European Pat. Off. | 523/145 |
| 2281398 | 8/1975 | France . | |
| 50-130627 | 4/1974 | Japan . | |
| 2154593 | 9/1985 | United Kingdom | 164/526 |

OTHER PUBLICATIONS

Hawley, "The Condensed Chemical Dictionary", Eighth Edition, various pages.
Borden Technical Information, No. 903, May 1981.

*Primary Examiner*—Richard K. Seidel
*Attorney, Agent, or Firm*—Robbins & Laramie

[57] ABSTRACT

An adhesive paste for adhering two or more objects, a composite assembly comprising two or more elements bonded by such paste, and a process for preparing cast metal articles using such paste are provided. The adhesive paste comprises an aqueous solution of a specific alkali phenol-formaldehyde resin and a hardener for that resin, wherein the paste prepared by mixing the resin and hardener has a viscosity, as mixed, in the range of about 1,000 cps to about 15,000 cps. The composite assembly comprises at least two separate elements bonded by the adhesive paste of the invention. The process uses a mold or core assembly having at least two separate elements. The elements are bonded by applying a coating of the paste of the invention to a surface which is to be bonded to a surface of a different element; placing the surfaces in confronting, engaging relationship and allowing an adhesive bond to form; introducing molten metal into the mold assembly or around the core assembly; allowing the molten metal to harden; and removing the bonded mold or core assembly.

36 Claims, No Drawings

4,862,948

PHENOLIC RESIN ADHESIVE PASTES, ASSEMBLIES PREPARED THEREFROM, AND PROCESSES FOR PREPARING CAST METAL ARTICLES USING THESE PASTES

FIELD OF THE INVENTION

The present invention relates to adhesive paste compositions, and to methods for making, curing and using such adhesive paste compositions. The paste compositions of the present invention are especially useful for bonding together foundry elements, such as cores and molds, so as to assemble these elements into molding assemblies for casting molten metals.

The adhesive paste compositions of the invention can easily be applied to shaped foundry articles. They can be formulated to have gel times that can be adjusted in their durations, to facilitate the construction of foundry assemblies that are to be adhered together for use in casting molten metals.

More particularly, the invention relates to adhesive paste compositions that can be packaged in at least two separate packages, for mixing by the foundryman just prior to use. When these adhesive paste components are mixed, the resulting paste is a true chemically-curing adhesive that cures at room temperature and that requires no heating and no extended drying time to achieve a high tensile strength cure.

The present invention also is concerned with securing together separate elements of foundry cores and molds so as to fabricate a molding assembly. Such separate elements of foundry core and/or mold elements may be made from a foundry mix containing a foundry aggregate and a resin binder composition. The foundry mix is introduced into a pattern and hardened to become self-supporting. The shaped foundry mix is removed from the pattern and allowed to further cure to thereby obtain a hard, solid, cured foundry element. Such foundry elements then are secured together using adhesive paste according to this invention, to fabricate a molding assembly.

Furthermore, the present invention is concerned with a process for casting metal. The process comprises fabricating a molding assembly as discussed above and pouring molten metal into or around the assembly. The metal is allowed to cool and solidify and the molded metal article is then separated from the molding assembly.

BACKGROUND OF THE INVENTION

Attempts have been made in the past to use adhesive compositions to bond together foundry elements of the type described into a composite molding assembly. As used in this specification, the term "foundry element" means molding elements made of aggregate foundry mixes, such as cores and molds. Molding elements made of other materials such as ceramic may also be used.

Such prior art uses of binder type compositions as foundry adhesives have encountered various problems and have resulted in a number of deficiencies.

One problem is in the difficulty of controlling gel times, such that the adhesives cure too rapidly or too slowly for practicality.

A second problem concerns difficulty of application due to the resin component being too viscous, preventing easy mixing and application, and the hardener component being too thin, so that it penetrates too deeply into the mold or core elements, leaving insufficient paste at the interface for bonding. U.S. Pat. No. 3,993,284 discloses a foundry core paste having a viscosity of 30,000 centipoise, making it difficult to mix and apply. Substantial differences in viscosities between the components also result in poor mixing characteristics leading to unpredictable gel times.

Self-setting adhesive foundry pastes are also known, such as the urethane paste of U.S. Pat. No. 4,692,479. However, this paste is deficient in that it is not water-cleanable, contains nitrogen and isocyanate and may generate byproducts which may cause casting defects.

Other deficiencies of the prior art include unworkable consistencies; foaming and other characteristics causing dimensional changes after application; low tensile strengths; resoftening with heat; deterioration of adhesive upon water absorption, and the like.

Other prior art practices include the use of relatively expensive hot melt adhesives which are prone to thermal instability (resoftening or other loss of tensile strength) when subjected to heat from the molten metals being cast into shapes or other processing operations. Hot melt adhesives also may resoften upon core wash and oven drying of the molding elements. Such thermal instability allows the glued parts to shift, thereby ruining the tolerances of the cast metal shape. Softening of the adhesive also may result in run out of the molten metal, which similarly may destroy the tolerances of the cast shapes. Run out results from an inadequate adhesive seal between the molding assembly elements and also may result from an improper consistency of the applied adhesive. Another problem with hot melt adhesives is they are expensive and hazardous to handle and the equipment used for their application is subject to considerable down time and maintenance.

Prior art practices also include the use of air or oven dried adhesives, such as filled dextrin or lignosulfonate pastes and sodium silicate/silica flour/clay pastes. This class of adhesives is slow to cure and therefore significantly limits production rates. A delay of sometimes as much as 10 to 15 hours after gluing together the elements of the molding assembly may be necessary before molten metal can be poured into such an assembly. It has long been recognized that the elimination of such time delays would significantly increase production rates.

The use of lactone-curable and ester-curable alkaline phenolic resin resoles that cure at room temperature has been described. These resins are useful as binders for sand for making molds for foundry applications. See U.S. Pat. Nos. 4,426,467; 4,468,359, and 4,474,904, all of which are herein incorporated by reference.

By "phenolic resin" is meant the reaction products of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents and/or other ingredients present, and so forth). The reaction product, that is, the phenolic resin, will be a mixture of different molecules and may contain in widely varying ratios addition products, condensation products, and unreacted reactants such as unreacted phenol and/or unreacted aldehyde. By "addition product" is meant reaction products in which an organic group has been substituted for at least one hydrogen of a previously unreacted phenol or of a condensation product. By "condensation product" is meant reaction products with two or more benzene rings.

SUMMARY OF THE INVENTION

The present invention provides an adhesive paste for adhering two or more elements together to form, for example, an assembled mold useful for casting metal. This paste is room-temperature curable, is easily applied, is cleanable with water, has a controllable gel time and minimizes the generation of deleterious by-products.

The paste preferably comprises (a) an aqueous solution of an alkali phenol-formaldehyde resin having a weight average molecular weight ($\overline{M}_w$) of from about 700 to about 2,000, a formaldehyde:phenol molar ratio of from about 1.2:1 to about 2.6:1 and an alkali hydroxide:phenol molar ratio of from about 0.5:1 to about 1.2:1, wherein the alkali is selected from the group consisting of potassium, sodium, and mixtures thereof; and (b) from about 20% to about 20% by weight, based on the weight of resin solids, of a hardening agent for the resin. The hardening agent has at least one ester functional group and is capable of catalyzing the cure of the resin. The paste should have a viscosity, as mixed, in the range of about 1,000 centipoise to about 15,000 centipoise.

In another embodiment, the invention provides a composite assembly of elements useful in foundry molding formed by adhering together two or more separate elements, at least one of which comprises a refractory material bonded with a resinous binder material.

In another embodiment, the invention provides a process for preparing a cast metal article using a mold assembly or core assembly having at least two separate elements wherein at least one of the elements comprises a refractory material bonded with a resinous material. This process comprises (1) applying a coating of an adhesive paste as defined above to a surface of at least one of the resinous material-bonded mold or core elements, which coated surface is to be bonded to a surface of a different element; (2) placing the surfaces of the two elements in confronting, engaging relationship and allowing an adhesive bond to form between the surfaces to form a mold assembly or core assembly; (3) introducing molten metal into the interior of the mold assembly or around the core assembly; (4) allowing the molten metal to harden; and then (5) removing the mold assembly or core assembly.

DETAILED DESCRIPTION OF THE INVENTION

A number of requirements have been recognized for the use of adhesive pastes in making foundry molding assemblies. The paste viscosity should be in the range of 1,000 centipoise (cps) to 15,000 cps. The need for this consistency arises because it is desirable to apply the admixture by extrusion through a single applicator gun having a mixing chamber a short distance upstream of an outlet nozzle. A paste in this consistency range can be readily mixed and extruded. Another requirement is that the adhesive paste have a time period of workability adequate for application of the paste and positioning of the assembly elements. It also is desirable to have a cure time over which the paste reaches sufficient strength to hold the component elements in position soon after application.

Mold assembly cores and other parts after adhesion to each other may be treated by dipping in a water based refractory coating, and then heated to dry the assembly for about one hour after assembly. Accordingly, the adhesive paste must resist breakdown under the conditions of such water treatment or solvent-based refractory coating treatment and subsequent heating and drying.

The present invention meets the foregoing requirements for a satisfactory adhesive paste for molding assemblies and overcomes the deficiencies discussed above regarding prior art adhesive compositions and other techniques for fastening together foundry elements into a composite molding assembly. The adhesive paste of the present invention is made by mixing together, at or close to the time of use, two or three components. These are prepared and selected so that the paste produced has the desired characteristics of viscosity for good flow and proper penetration, gel time for pot life and workability, and cure time for the development of adequate strength for handling. The paste thus produced must be capable of gluing or "cementing" together foundry elements, such as sand cores and sand molds, at room temperature. The mixed paste is applied as a continuous "bead" or as discontinuous "spots" to appropriate surfaces of core and/or mold elements using mixing and applicator equipment of conventional design. The coated surfaces of adjacent pieces are then pressed and held together until the paste "sets".

The hardener generally is selected to provide a desirable pot life (working time) and cure time, to permit applying the paste, positioning the elements to be assembled, and then pressing together the elements into the molding assembly. The glued assembly then cures to form a thermally stable, securely bonded molding assembly into which or around which a molten metal may be poured for casting metal shapes. The time of workability before the adhesive paste gels and the time required for curing will vary with the hardener selected and with the amount of the hardener used. Although the adhesive compositions of the present invention are particularly designed to achieve curing at room temperature, it is to be understood that these adhesive compositions also can be cured by baking at elevated temperatures, and, in fact, a secondary cure usually occurs when the molten metal comes in contact with or heats the cured adhesive paste.

The foundry paste of the present invention is prepared by mixing a specific alkali phenol-formaldehyde resin with an ester functional hardening agent. The paste mixture should have a viscosity, as mixed, in the range of about 1,000 cps to about 15,000 cps. This viscosity may be achieved in a number of ways, discussed infra.

The binder compositions of the invention may be supplied as two-component systems comprising a resin component and a hardener component. The resin component comprises an aqueous solution of phenolic resin. The hardener component comprises, generally, a liquid material having at least one ester functional group. The preferred hardeners are esters, lactones or carbonates that can be saponified, that is, that react under alkaline conditions to form an acidic material. At the time of use, the two components may be combined first and then applied as an adhesive paste to the foundry elements or other elements that are to be united.

The Resin Component

The alkali phenol-formaldehyde resin component is preferably one prepared as in U.S. Pat. No. 4,474,904.

Optimally, the viscosity of this component is increased, as described below, either by dehydration of the aqueous resin solution, or by adding a thickening agent to it. Preferably, the resin solution is dehydrated, or specifically formulated to provide the desired viscosity and solids content.

The phenol formaldehyde resin is an aqueous solution. Before optional dehydration, the solids content of the aqueous solution is in the range of about 50% to about 75% by weight, preferably about 50% to about 65% by weight, and the viscosity is in the range of about 100 cps to about 150 cps. The resin portion may be dehydrated, i.e., to a viscosity of between about 1,000 to about 10,000 cps or a solids content in the range of about 60% to about 85% by weight to achieve the desired viscosity of the mixture of resin and hardener. Alternately, a less dilute solution may be prepared, so that dehydration is not necessary.

The phenol-formaldehyde resins used in this invention have a weight average molecular weight ($\overline{M}_w$) of from about 700 to about 2,000 and preferably from about 800 to about 1,700. Resins with $\overline{M}_w$ of less than about 700 give products which are relatively weaker or require significantly more resin to achieve similar strengths. Resins with $\overline{M}_w$ greater than 2,000 are either not adequately water soluble within the range of alkali hydroxide contents used in the invention or precipitate out of solution or cause the solution to gel before the resin has cured adequately, yielding products with poor strength.

Optimum results may not be obtained within the broad $\overline{M}_w$ range at the extreme limits of the ranges of alkali hydroxide:phenol and formaldehyde:phenol molar ratios, especially at the lower end of the alkali hydroxide phenol ratio. Satisfactory results have been obtained in the $\overline{M}_w$ range from about 800 to about 1,700, preferably above 950.

The resins used in this invention are alkali phenolformaldehyde resins by which is meant that the alkali in the resin is potassium alkali, sodium alkali, or mixtures thereof. This alkali can be present in the resin during manufacture or, more usually, may be added to the condensed resin as KOH, NaOH, or mixtures thereof, preferably in aqueous solution of suitable strength. The alkalinity of the resin is expressed in terms of its alkali hydroxide content and specifically by the molar ratio of alkali hydroxide to the phenol in the resin. Other alkalis are not expressly excluded and may be present in minor amounts.

The molar ratio of alkali hydroxide:phenol in the resin solution is in the range of about 0.5:1 to about 1.2:1 and preferably about 0.6:1 to about 1.2:1. At ratios less than 0.5 the speed of cure and product strength are much reduced. The reasons for this are not entirely clear but it seems probable that at such low ratios the resin tends to be insoluble or precipitates from solution during curing. Also it is believed that a relatively high alkali hydroxide:phenol ratio increases the concentration of phenolate-type anions which enhances activity of the resin to curing by cross-linking. Ratios higher than about 1.2 are not used because the excess alkali hydroxide makes the resins hazardous to handle and inhibits curing by oversolubilizing the resin and/or reducing the effect of ester catalysis. The use of alkali hydroxide:phenol ratios lower than about 0.6 is not preferred with resins having $\overline{M}_w$ less than about 800 because the speed of cure and product strength is below that which is optimal.

The resins used have a formaldehyde to phenol molar ratio of from about 1.2:1 to about 2.6:1. Lower ratios are not used because resins of lower strengths result therefrom. Higher ratios are not used because low molecular weight resins, or resins which are excessively crosslinked, or which contain undesirably high levels of unreacted formaldehyde, result. Within the preferred limits of this ratio, suitable highly condensed resins, having low levels of unreacted formaldehyde and high reactivity, can be obtained.

Optionally, the resin may comprise small amounts of modifiers or additives such as silanes, urea, or polyhydric phenols such as resorcinol. When used, up to about 5 percent by weight of the modifier, based on resin solids, may be used. Solvents, e.g., alcohols such as methanol, ethanol, furfuryl alcohol or butyl carbitol, may be used, in amounts up to about 10 percent by weight based on resin solids.

In summary, the resin used satisfies the following criteria: (a) $\overline{M}_w$ from about 700 to about 2,000; (b) alkali hydroxide:phenol molar ratio of about 0.5:1 to about 1.2:1; and (c) formaldehyde:phenol molar ratio of about 1.2:1 to about 2.6:1.

The viscosity of the aqueous resin solution is measured using a Brookfield viscometer at 25° C., generally measured with spindle 2 or 3 at the appropriate speeds.

The weight average molecular weight ($\overline{M}_w$) is measured using gel permeation chromatography. The sample whose molecular weight is to be measured is prepared as follows. The resin sample is dissolved in tetrahydrofuran, and neutralized with 1N hydrochloric or sulfuric acid. The salt which results is removed by filtration, and the supernatant liquid run through a gel permeation chromatograph.

The aqueous solution of the alkali phenolformaldehyde resin will customarily be produced or purchased commercially at a solids content of from 50% to 65% by weight. The solids content is measured by heating a weighed sample (2.0±0.1 g) in an air circulating oven for 3 hours at 100° C. As described hereafter, the resin solution may be modified to increase its viscosity, to make it more useful as a paste component.

The Hardener Component

The second component of the foundry paste is a hardening agent for the resin. The hardening agent has at least one ester functional group and is capable of catalyzing the cure of the resin. The hardening agent may be selected from the group consisting of lactones, organic carbonates, carboxylic acid esters or mixtures thereof. Generally, it is preferred to use hardening agents having from 3 to 12 carbon atoms, and more preferably from 4 to 12 carbon atoms. It is most advantageous to use a curing agent with a reactivity time of between about one and about thirty minutes to gelation, following mixing.

Examples of lactones which accelerate the cure or hardening of phenolic resins include, but are not limited to, gamma-butyrolactone, valerolactone, caprolactone, beta-propiolactone, beta-butyrolactone, beta-isobutyrolactone, beta-isopentylactone, gamma-isopentylactone, delta-pentylactone, and epsilon-caprolactone. The preferred lactone is gamma-butyrolactone.

Examples of organic carbonates which accelerate the hardening of phenolic resins include, but are not limited to, propylene carbonate, ethylene glycol carbonate, glycerol carbonate, 1,2-butanediol carbonate, 1,3-butanediol carbonate, 1,2-pentanediol carbonate and 1,3-pentanediol carbonate. A preferred organic carbonate is propylene carbonate. Other esters of short and medium chain (e.g., one carbon to ten carbon) alkyl-monohydric or polyhydric alcohols, with short or medium chain (e.g., carboxylic acids having one to ten carbon atoms) may be used.

Carboxylic acid esters which accelerate the hardening of phenolic resins include, but are not limited to, n-butyl acetate, ethylene glycol diacetate and triacetin (glycerol triacetate). In the case where a carboxylic acid ester is used, triacetin is preferred.

Other aliphatic monoesters may be suitable, such as propionates, butyrates or pentanates, and the like. Additional aliphatic multiesters which may be suitable include diformate, diacetate, or higher diesters of ethylene glycol, diethylene glycol, propylene glycol, butylene glycol, glycerol, 1,3-propanediol, 1,3-butanediol, and 1,4-butanediol. Furthermore, diesters of dicarboxylic acids, such as dimethyl malonate, dimethyl glutarate, dimethyl adipate, and dimethyl succinate, are suitable.

An advantage of the present invention is that the gel time, i.e., the time required for the paste to harden, can be controlled by appropriate choice of hardening agent. For example, propylene carbonate and gamma-butyrolactone will cause gelation to occur in about 60 seconds and 90 seconds, respectively, whereas triacetin will delay gelation to about 10 to 12 minutes, and dimethyl glutarate will not cause complete gelation for about 30 minutes. By mixing different hardening agents, it is possible to attain a gel time which is slow enough to allow adequate time for pasting, but rapid enough so as to allow for economical use in the foundry.

The hardening agent is usually used in an amount from about 20% to about 120% by weight, based on the weight of the alkaline phenolic resin, dry solids basis, and preferably from about 60% to about 90% by weight based on the weight of the resin solids, in order to minimize resin shrinkage and maximize tensile strength.

Preparation of the Adhesive Paste

The paste of the present invention should have viscosity in the range from about 1,000 cps to about 15,000 cps. This may be achieved in several ways. A single component may be increased in viscosity, so that when the components are mixed the paste viscosity is in the desired range. In another approach, both the resin solution and the liquid hardener are thickened. In still another approach, the resin solution, and the liquid hardener, and a viscosity increasing agent are mixed together at the same time. The viscosities of the resin, hardening agent and paste are all measured using a Brookfield Viscometer at 25° C., generally measured with spindle 2 or 3 at the appropriate speeds.

Preferably, the resin component of the paste may be modified to increase its viscosity to between about 1,000 cps and about 10,000 cps, preferably between about 3,000 cps and about 6,000 cps, and more preferably to about 5,000 cps.

One preferred method of increasing the viscosity of the resin is to dehydrate it. Preferably, the aqueous solution of the resin will have a solids content of about 55% to about 75%, and preferably from about 60% to about 75% by weight, based on the weight of the solution. Dehydration may be accomplished by heating under reduced pressure, i.e., preferably at a temperature less than 60° C.

Alternatively, the viscosity of the resin component may be increased to the desired range by adding a thickening agent. Any standard thickener which is not adversely affected by alkaline conditions may be used.

Suitable types of thickening agent which may be added to the resin solution to increase its viscosity are vegetable gums or clays. The thickening agent may be included in an amount of between about 0.25% and about 50% by weight, based on the weight of the resin solution.

Examples of suitable vegetable gums include xanthan, tragacanth, guar, carrageenan, and mixtures thereof. Preferred gums include xanthan, tragacanth, or mixtures of the two. When a vegetable gum is used as the thickening agent, it is preferably used in an amount of between about 0.25% and about 5.0%, and more preferably about 0.25% to about 1.0%, based on the weight of the resin solution to which it is added.

Another suitable class of thickening agents which may be used to increase the viscosity of the resin solution is clays. When clays are used, they are typically present in an amount of between about 10% and about 50%, preferably between about 10% and about 25% by weight, based on the weight of the resin solution to which it is added. Clays and related thickeners include bentonite (i.e., Western or Southern bentonites), attapulgite or calcined clay. Diatomaceous earth can also be used. These materials may be used alone or in combination with other clays or gums. Fumed silica may be used to thicken the resin component; however, such thickened resins are unstable and must be used within a few hours after mixing.

Preferably, the hardening agent component may also be increased in viscosity by the addition thereto of a thickener. A suitable thickening agent is fumed silica. When used, this thickener is used at between about 1% and about 6% by weight based on the weight of the liquid hardener, and preferably between about 3% and about 5% by weight.

Preferably, the hardener component is thickened to a viscosity in the range of about 1,000 cps to about 15,000 cps, and most preferably about 5,000 cps to about 10,000 cps.

Preferably, both the resin component and the hardener component are increased in their viscosities by dehydration and by the addition of thickeners, respectively. More preferably, the resin component is thickened by dehydration and the hardener component by addition thereto of fumed silica. The viscosity of the paste prepared from a mixture of the dehydrated resin solution and the thickened hardening agent should be in the range of about 1,000 cps to about 15,000 cps, and preferably at least about 3,000 cps.

Use of the Paste

The adhesive paste of the present invention may be used to bond two or more resin-bonded objects of like composition or of dissimilar composition, or may be used to bond resin-bonded objects to other porous objects used in foundry applications. In non-foundry uses, wood, paper or other porous pieces may be bonded.

The invention thus further comprises a process for preparing a cast metal article using a mold assembly or a core assembly made by bonding together with the paste two or more separate elements, at least one of which is generally a resin-bonded refractory material such as sand. The process comprises the steps of applying a coating of the adhesive paste to a surface of at least one of the mold or core elements, then pressing it against the surface of a second element of the mold assembly or core assembly. These surfaces are held together in confronting, engaging relationship, allowing an adhesive bond to form between the surfaces. Molten metal is introduced into the interior of the mold assembly or around the core assembly thus formed. The molten metal is allowed to cool and harden. Finally, the mold assembly or core assembly is removed.

After application of the paste, an adhesive bond is formed by gelation of the paste. One advantage of the paste of this invention is that, by proper choice of the hardening agent, the user can select a gel time which is convenient for his purposes. The gel time should be long enough that the paste will not set up before it can conveniently be applied to the surfaces to be joined, but short enough that it will not take an inconveniently long period of time to set up. Generally, the adhesive bond between the surfaces should be allowed to set for at least sixty seconds before introduction of the molten metal.

Another advantage is that a properly formulated paste is capable of curing at room temperature so that an expenditure of energy to effect a cure is not required.

The Assembly

The invention further comprises a composite assembly of elements for use in foundry molding. The shape comprises two or more separate elements, at least one of which generally comprises a refractory material bonded with a resinous material. The separate elements are bonded by the adhesive paste of the invention.

The composite shape is preferably prepared from two or more separate elements, each made from a refractory material that is bonded with a resinous material which may be inorganic or organic.

The granular refractory material may be silica sand, quartz, chromite sand, zircon, olivine sand, beach sand, or mixtures of these.

Suitable examples of such resin-bonded refractory materials are described in U.S. Pat. Nos. 4,468,359 and 4,474,904, both issued to Lemon et al. and assigned to Borden (UK) Limited, and both incorporated herein by reference. The patents disclose foundry molds or cores prepared from a granular refractory material, an aqueous solution of an alkali phenol-formaldehyde resin, a silane, and an ester curing agent that may be in the liquid or vapor state.

Another suitable resin-bonded refractory material is described in U.S. Pat. No. 4,546,124 to Laitar et al., also incorporated herein by reference. This patent discloses moldable compositions for foundry articles including an aggregate and a binder which comprises a polyisocyanate, a polyhydroxy component, and a catalyst.

Other suitable resin binders from which the Refractory object may be made includes hot box resins; nobake or cold box urethane resins; cold box alkaline phenolic resins; S02-epoxy, -furan, or -acrylic resins; $CO_2$-sodium silicate resins; phenolic ester no-bake resins; acid-catalyzed phenolic or furan resins; ester-catalyzed phenolic resins; ester-catalyzed silicate resins; phenolic baking resins; and core oil-based resins.

Metal Casting

The molten metal may be introduced into the mold assembly or around the core assembly in any manner known in the art. However, use of an adhesive paste appears to be especially crucial in the case wherein the metal is cast using the Hitchner process, whereby metal is cast under vacuum conditions. In this process, the metal is introduced at a temperature sufficiently high to render it molten, i.e., in the range of about 1,370° C. to about 1,700° C. (i.e., 2,500° F. to 3,100° F.), for iron or steel. Non-ferrous pouring temperatures are generally somewhat lower. An unexpected advantage of the paste is that, at the temperatures at which molten metal is poured, the adhesive paste appears to experience a secondary cure, resulting in an even stronger bond capable of withstanding the thermal and mechanical stresses imposed on it by the foundry process.

Another advantage of the adhesive paste of the present invention is that, at the casting temperatures to which the paste is exposed, very small amounts or no carbon, isocyanate, nitrogen, sulfur and other gases are generated, that have the potential to cause casting defects in the foundry articles prepared in their presence. This is a distinct advantage over prior art pastes including polyurethane pastes, which may generate such by-products.

Finally, after the molten metal has sufficiently hardened, the foundry mold or core may be removed from around or inside of the metal shape thus formed.

The following Examples serve to further illustrate the invention. In these Examples and elsewhere throughout this application, all parts and percentages are by weight, and all temperatures are in degrees Celsius unless expressly stated to be otherwise.

EXAMPLE 1

A paste was prepared as follows. 150 grams of ALpHASET 9000 potassium alkaline phenol formaldehyde resin solution from Borden, Inc., Columbus, Ohio, were used. This resin solution has a solids content of about 50%. The resin has a formaldehyde:phenol ratio of about 1.81:1, a KOH:phenol ratio of about 0.86:1 and an $\overline{M}_w$ typically in the range of 800–1,200. The resin solution was thickened to 5,000 cps by dehydration under vacuum at 45° C., to a solids content of about 60%, and then mixed for 60 seconds with a 60.0 gram portion of a hardening agent prepared by mixing 5,153 grams of triacetin with 258 grams of Cab-O-Sil fumed silica (from Cabot Corporation, Tuscola, Illinois). This was a weight ratio of 57.4 grams of triacetin hardener to about 90 grams of resin solids, dry solids basis, which on a percentage by weight basis is about 64% of triacetin hardener based on resin solids.

The mixture was poured into a pouring bottle and applied to the cut surface of tensile dogbones cut through a one square inch section. After 18 minutes, the adhesive paste became a very thick gel. After 30 minutes, the adhesive was still tacky. It had only a slight tack after an hour or so.

Six groups containing three cut dogbones each were glued and the reglued dogbones' tensile strengths measured after varying periods of time. The table below shows the elapsed time before the measurement of tensile strength; the average of the tensile strength measurements made on the three dogbones in each group after bonding; and the point of failure of the dogbone.

| Elapsed Time (Hours) | Average Tensile Strength (psi) | Point of Bond Failure |
|---|---|---|
| 2 hours | 172 | In one case, break occurred |

-continued

| Elapsed Time (Hours) | Average Tensile Strength (psi) | Point of Bond Failure |
|---|---|---|
| 4 hours | 144 | within the paste; in a second, within the core; and in the third, at the paste/core interface In each case, break occurred at the paste/core interface |
| 8 hours | 146 | In two cases, break occurred within the paste; in the third, at the paste/core interface |
| 24 hours | 191 | In one case, break occurred within the paste; in two other cases, at the paste/core interface |
| 48 hours | 186 | In each case, break occurred at the paste/core interface |
| 72 hours | 206 | In two cases, break occurred between the paste and sand; in the third, at the core/paste interface |

EXAMPLES 2–5

1,574 grams of ALpHASET 9000 potassium alkali phenol formaldehyde resin solution was thickened to 5000 cps by dehydration under vacuum at 45° C. to a solids content of about 60% Several different paste formulations were made up by adding to aliquot portions of the thickened resin different amounts of a hardener component comprised of triacetin and 4% Cab-O-Sil fumed silica. The paste aliquots were used to bond four broken urethane-bonded cold box cores each, and the shrinkage and tensile strengths were determined to be as follows at the following levels of hardener component addition:

| Example No. | Tensile Strength of Test Core Piece Before Breaking (psi) | % by Weight of Hardener, Based on Resin Solution | Shrinkage after 24 hours | Tensile Strength of Pasted Core Piece (psi) | % of Original Tensile Strength After Pasting |
|---|---|---|---|---|---|
| 2 | 330 | 20 | bad | 305 | 92 |
| 3 | 400 | 30 | some | 315 | 79 |
| 4 | 375 | 40 | none | 275 | 73 |
| 5 | 355 | 50 | slight | 220 | 62 |

EXAMPLE 6

To 10 grams of ALpHASET 9010 urea-modified potassium alkaline phenol formaldehyde resin solution (from Borden, Inc., Columbus, Ohio) were added 5 grams of Volclay 200 Western bentonite clay (from American Colloid, Skokie, Illinois) to form a thick paste. The resin had a formaldehyde:phenol ratio of 1.81:1, a KOH:phenol ratio of 0.86:1, and a typical $\overline{M}_w$ of 800–1,200. To this paste was added, with stirring, 2.5 grams of triacetin hardening agent (unthickened). The resulting paste was used to bond together, for repair purposes, two broken core halves that had been made of BETASET gas-cured phenol formaldehyde resin (also from Borden). The paste gelled in 12 minutes and was set to hardness after about 15 minutes. When rebroken, the paste-bonded core piece broke at the paste-to-sand boundary, rather than through the paste itself, indicating its relative strength.

EXAMPLES 7–13

The process of Example 6 was duplicated except that the following thickeners were added to 10 gram samples of the resin respectively, instead of the 5 grams of Volclay that was used in Example 6:

| Example No. | Thickener | Amount (grams) |
|---|---|---|
| 7 | Celite diatomaceous earth (from Manville Filtration and Minerals, Lompoc, California) | 4 |
| 8 | Bentone EW Mg salt of bentonite (from NL Chemicals, Hightstown, New Jersey) | 2 |
| 9 | Magcogel Clay (from Dresser Industries, Incorporated, Chicago, Illinois) | 3 |
| 10 | Attagel 50 attapulgite; hydrated aluminum-magnesium silicate (from Englehardt Minerals, Edison, New Jersey) | 1.5 |
| 11 | Calcined Kaolin clay | 2 |
| 12 | Volclay 200 Western Bentonite clay | 4 |
| 13 | Kelzan S xanthan gum solids (from the Kelco Division of Merck and Company, San Diego, California) | 1 |

Each mixture gelled in about 12 minutes when 2.5 grams of the triacetin were added.

EXAMPLES 14 and 15

50 grams of ALpHASET 9010 resin solution and 25 grams of Volclay 200 Western Bentonite clay were mixed. To a 15 gram portion of this mixture was added 2.5 grams of triacetin and the combination mixed for 20 seconds. The paste which resulted was applied to an ALpHASET resin-bonded cold box core (Example 14) and a urethane-bonded cold box core (Example 15). In both cases, gel time was about 11 minutes. When the core was rebroken, failures occurred at the paste/core boundary rather than through the paste.

EXAMPLES 16 and 17

The procedure of Examples 14 and 15 was duplicated except that 2.5 grams of butyrolactone were used as hardening agent instead of triacetin. After about 15 seconds' mixing, the resulting paste was quickly applied to ALpHASET resin-bonded (Example 16) and urethane-bonded (Example 17) cores. The paste gelled in about 55 seconds. Bonding similar to that observed in Examples 10 and 11 was again seen, except that the gel time was much faster.

EXAMPLE 18

Example 16 was repeated except that a mixture of 1.25 grams of triacetin and 1.25 grams of butyrolactone were used. After 20 seconds' mixing, a gel time of 90 seconds was observed.

EXAMPLES 19 and 20

30 grams of ALpHASET 9010 resin solution and 3 grams of Kelzan S xanthan gum solids were mixed. 2.5 grams of triacetin (Example 19) or 2.5 grams butyrolactone (Example 20) were each added to 10 gram portions of the mixture, respectively. The gel times of the resultant pastes were 11 minutes and 60 seconds, respectively. Again ALpHASET-resin bonded cores, made with these pastes, broke at the paste/sand interface.

EXAMPLE 21

0.65 parts of Kelzan S xanthan gum thickener were added to 100 grams of ALpHASET 9000 potassium alkali phenol formaldehyde resin solution. To a 10 gram portion of this mixture was added 4 grams of triacetin containing 4% fumed silica thickener. The thickened triacetin component represented 40 percent of the weight of the thickened resin solution. No shrinkage of this paste was observed after 1 day and only slight shrinkage after 3 days.

EXAMPLE 22

A thickened resin was prepared by mixing 1,500 grams of ALpHASET 9000 resin solution with 15 grams of Kelzan S xanthan gum solids and 75 grams of Celite diatomaceous earth. A 150 gram portion of this thickened resin solution was mixed with 37.5 grams of unthickened triacetin hardening agent for 30 seconds. The mixture was poured into a plastic bottle and then dispensed from the bottle onto the interface between the cope and drag portions of a phenolic resin-bonded mold.

The paste appeared to be gelled 15 minutes after the mixing step and dry within one hour. The pasted mold was allowed to cure overnight before molten metal was poured into it and the resulting metal casting subsequently removed. The paste provided good bonding for the mold assembly throughout the operations.

CONCLUSION

There has thus been provided an adhesive paste which is self-hardening, room temperature-curable, cleanable with water, capable of secondarily curing at casting temperatures, and relatively free of the generation of gases that might cause casting defects.

The adhesive paste of the present invention has numerous advantages over adhesive pastes of the prior art for similar applications. The adhesive may be applied with a highly portable dispensing gun having self-contained cartridges or chambers for each component, or in a dispensing gun having two flexible supply conduits for ease of movement but having some restrictions on portability as defined by the length of the hose or hoses providing these conduits. The dispensing gun is operable with one hand because core and mold assembling operations require foundrymen to dispense adhesive with one hand while setting cores and mold pieces with the other.

Since the viscosity of each part, i.e., thickened resin solution and thickened hardener, may be approximately equal at the time of mixing and is selected to permit ease of pumping, flow surges are substantially eliminated, thereby avoiding unexpected changes in mixing ratios. Furthermore, the new adhesive does not require special solvent flushing equipment and operations using a separate solvent component as do certain prior art pastes. With the new adhesive system, flushing is accomplished easily with water.

Another advantage of the present invention is that gel times may be adjusted up or down according to the needs of the particular core and mold assembling operation. This depends upon the amount and type of hardener used. Gel times may be within the range of one minute or less to over an hour, to meet particular bonding requirements.

In some prior art adhesive core pastes, the resin component was extremely viscous while the hardener component was extremely liquid. The present invention permits the formulator to adjust the viscosity of the hardener component and the viscosity of the resin component to similar values The present invention thus provides a high-performance, two-part adhesive paste for assembling foundry elements, such as cores and molds, into molding assemblies. The strength of the adhesive bond achieved between the foundry elements may be sufficient to eliminate the use of mechanical fasteners for holding the shapes together during the casting of molten metal. The high tensile strength, heat resistance, and swelling resistance of the cured adhesive paste prevents slipping or shifting of the foundry shapes during oven treatment and metal pouring. The adhesive paste can be readily applied as spots or beads according to the job requirements. Conventional equipment can be used to meter, mix and apply the proper amounts of adhesive. The equipment used in combination with the adhesive paste also can be easily adapted to either manual or remote control operation.

The adhesive paste of the invention is useful at or near room temperature (i.e., about 60° F. to about 80° F.). Accordingly, no ovens or lengthy drying times are required for sufficient curing to achieve the desired tensile strengths for handling the molding assembly. The adhesives can be supplied to the end user with differing gel times in order to accommodate different job requirements. In this regard, higher temperatures will usually shorten gel times while colder temperatures will ordinarily extend gel times. Colder temperatures also may increase viscosity so care must be taken not to unduly restrict flow through pumping mechanisms and applicator conduits.

The tensile strength of the cured adhesive paste of the invention is generally stronger than the binder composition used to form cores and mold elements from a sand aggregate. Thus, the molding assemblies can generally be handled without failure of the adhesive paste. Similarly, core and other washes of the foundry shapes will not adversely effect the tensile strength of the adhesive joint. Such high tensile strengths can be achieved within minutes to fractions of an hour, depending on the gel time selected. The high tensile strength may eliminate the need for mechanical fasteners. The rapid gel times available signficantly improve productivity of the foundry operation. The adhesive paste will not resoften during post assembly operations such as washing and oven drying.

Virtually all types of cores and molds can be assembled with the adhesive paste regardless of the binder used in making the cores or mold pieces from aggregate such as sand. These cores and molds can be almost of any size or shape. The molding assemblies made from these foundry shapes might include impeller core assemblies, cylinder block barrel core assemblies, oil pump core assemblies, water jacket core assemblies, and intake manifold core assemblies for combustion engines.

While the invention has been disclosed in this patent application by reference to the details of some preferred embodiments of the invention, it is to be understood that this disclosure is intended in an illustrative rather than in a limiting sense, as it is contemplated that modifications will readily occur to those skilled in the art within the spirit of the invention and the scope of the appended claims.

What is claimed is:

1. A composite assembly of elements for use in foundry molding comprising at least two separate elements, at least one of which comprises a refractory material bonded with a resinous material, said two or more separate elements being adhered together by an adhesive paste comprising:
   (a) an aqueous solution of an alkali phenolformaldehyde resin having a weight average molecular weight ($\overline{M}_w$) of from about 700 to about 2,000, a formaldehyde:phenol molar ratio of from about 1.2:1 to about 2.6:1 and an alkali hydroxide:phenol molar ratio of from about 0.5:1 to about 1.2:1, wherein the alkali is selected from the group consisting of potassium, sodium, and mixtures thereof; and
   (b) from about 20% to about 120% by weight, based on the weight of resin solids, of a hardening agent for said resin, said hardening agent having at least one ester functional group and being capable of catalyzing cure of said resin,
   wherein the paste prepared by mixing (a) and (b) has a viscosity, as mixed, in the range of about 1,000 cps to about 15,000 cps.

2. The composite assembly of claim 1, wherein said assembly is a foundry mold.

3. The composite assembly of claim 1, wherein said assembly is a foundry core.

4. The composite assembly of claim 1, wherein at least one object comprises a refractory material selected from the group consisting of silica sand, quartz, chromite sand, zircon, olivine sand, beach sand, and mixtures thereof, bonded with a resinous binder.

5. The composite assembly of claim 1, wherein component (a) has a viscosity, before mixing with (b), in the range of about 1,000 cps to about 10,000 cps.

6. The composite assembly of claim 17, wherein said component (a) includes a thickening agent in an amount of between about 0.25% and about 50% by weight, based on the weight of resin solution.

7. The composite assembly of claim 17, wherein said thickening agent is present in an amount of between about 0.25% and about 5.0% by weight, based on the weight of resin solution, and is a vegetable gum selected from the group consisting of xanthan, tragacanth, guar, carrageenan, and mixtures thereof.

8. The composite assembly of claim 5, wherein said thickening agent is present in an amount of between about 0.25% and about 50% by weight, based on the weight of resin solution, and is a clay selected from bentonite, attapulgite, calcined clay, diatomaceous earth, and mixtures thereof.

9. The composite assembly of claim 1, wherein component (b) has a viscosity, before mixing with (a), in the range of about 1,000 cps to about 15,000 cps.

10. The composite assembly of claim 21, wherein said component (b) includes a thickening agent in an amount of between about 1% and about 6%, based on the weight of the hardener.

11. The composite assembly of claim 10, wherein said thickening agent is fumed silica.

12. The composite assembly of claim 1, wherein said hardening agent is selected from the group consisting of lactones, carboxylic acid esters, organic carbonates and mixtures thereof.

13. The composite assembly of claim 12, wherein said hardening agent has from 3 to 12 carbon atoms.

14. The composite assembly of claim 13, wherein said hardening agent is selected from the group consisting of propylene carbonate, triacetin, gammabutyrolactone, and mixtures thereof.

15. The composite assembly of claim 1, wherein the adhesive paste prepared by mixing (a) and (b) has a viscosity, as mixed, of at least about 3,000 cps.

16. A process for preparing a cast metal article using a mold or core assembly having at least two separate elements wherein at least one of the elements comprises a refractory material bonded with a resinous material, the process comprising:
   (i) applying a coating of an adhesive paste to a surface of at least one of said resinous material-bonded mold or core elements, which coated surface is to be bonded to a surface of a different element, said adhesive paste comprising:
      (a) an aqueous solution of an alkali phenol-formaldehyde resin having a weight average molecular weight ($\overline{M}_w$) of from about 700 to about 2,000, a formaldehyde:phenol molar ratio of from about 1.2:1 to about 2.6:1 and an alkali hydroxide:phenol molar ratio of from about 0.5:1 to about 1.2:1, wherein the alkali is selected from the group consisting of potassium, sodium, and mixtures thereof; and
      (b) from about 20% to about 120% by weight, based on the weight of the resin of a hardening agent for said resin, said hardening agent having at least one ester functional group and being capable of catalyzing curing of said resin,
   wherein the paste prepared by mixing (a) and (b) has a viscosity, as mixed, in the range of about 1,000 cps to about 15,000 cps.;
   (ii) placing said surfaces in confronting, engaging relationship and allowing an adhesive bond to form between said surfaces to form a mold assembly or core assembly;
   (iii) introducing molten metal into the interior of said mold assembly or around said core assembly;
   (iv) allowing said molten metal to harden; and
   (v) removing said mold assembly or core assembly.

17. The process of claim 16 wherein said molten metal is introduced into said mold assembly or around said core assembly under vacuum conditions.

18. The process of claim 16 wherein said resinous material used to bond said refractory material is an inorganic binder.

19. The process of claim 16 wherein said resinous material used to bond said refractory material is an organic binder.

20. The process of claim 19 wherein said resinous material used to bond said refractory material is a phenolic resin.

21. The process of claim 19 wherein said resinous material used to bond said refractory material is a polyurethane resin.

22. An adhesive paste for adhering two or more objects comprising:
   (a) an aqueous solution of an alkali phenolformaldehyde resin having a weight average molecular weight ($\overline{M}_w$) of from about 200 to about 2,000, a formaldehyde:phenol molar ratio of from about 1.2:1 to about 2.6:1 and an alkali hydroxide:phenol molar ratio of from 0.5:1 to about 1.2:1, wherein the alkali is selected from the group consisting of potassium, sodium, and mixtures thereof, and wherein said resin has a viscosity, before mixing with (b), in the range of from about 1,000 cps to about 10,000 cps, and wherein said resin has added thereto a thickening agent in an amount of between about 0.25% and about 50% by weight, based on the weight of the resin solution, as a viscosity increasing agent, wherein said thickening agent is a vegetable gum selected from the group consisting of xanthan, tragacanth, guar, carrageenan, and mixtures thereof; and (b) from about 20% to about 120% by weight, based on the weight of resin solids, of a hardening agent for said resin, said hardening agent having at least one ester functional group and being capable of catalyzing cure of said resin, wherein the paste prepared by mixing (a) and (b) has a viscosity, as mixed, in the range of about 1,000 cps to about 15,000 cps.

23. The adhesive paste of claim 22, wherein said hardening agent is selected from the group consisting of lactones, carboxylic acid esters, organic carbonates and mixtures thereof.

24. The adhesive paste of claim 23 wherein said hardening agent has from 3 to 12 carbon atoms.

25. The adhesive paste of claim 23, wherein said hardening agent is selected from the group consisting of propylene carbonate, triacetin, gamma-butyrolactone, and mixtures thereof.

26. The adhesive paste of claim 22, wherein the paste prepared by mixing (a) and (b) has a viscosity, as mixed, of at least about 3,000 cps.

27. An adhesive paste for adhering two or more objects comprising:

(a) an aqueous solution of an alkali phenolformaldehyde resin having a weight average molecular weight ($\overline{M}_w$) of from about 700 to 2,000, a formaldehyde:phenol molar ratio of from about 1.2:1 to about 2.6:1 and an alkali hydroxide:phenol molar ratio of from about 0.5:1 to about 1.2:1, wherein the alkali is selected from the group consisting of potassium, sodium, and mixtures thereof, and wherein said resin has a viscosity, before mixing with (b), in the range of from about 1,000 cps to about 10,000 cps, wherein said resin has added thereto a thickening agent in an amount of between about 10% and about 50% by weight, based on the weight of the resin solution, wherein said thickening agent is a clay selected from bentonite, attapulgite, calcined clay, diatomaceous earth, and mixtures therof; and (b) from about 20% to about 120% by weight, based on the weight of resin solids, of a hardening agent for said resin, said hardening agent having at least one ester functional group and being capable of catalyzing cure of said resin, wherein the paste prepared by mixing (a) and (b) has a viscosity, as mixed, in the range of about 1,000 cps to about 15,000 cps.

28. The adhesive paste of claim 27, wherein said hardening agent is selected from the group consisting of lactones, carboxylic acid esters, organic carbonates and mixtures thereof.

29. The adhesive paste of claim 27, wherein said hardening agent has from 3 to 12 carbon atoms.

30. The adhesive paste of claim 27, wherein said hardening agent is selected from the group consisting of propylene carbonate, triacetin, gamma-butyrolactone, and mixture thereof.

31. The adhesive paste of claim 27, wherein the paste prepared by mixing (a) and (b) has a viscosity, as mixed, of at least about 3,000 cps.

32. An adhesive paste for adhering two or more objects comprising:

(a) an aqueous solution of an alkali phenolformaldehyde resin having a weight average molecular weight ($\overline{M}_w$) of from about 700 to about 2,000, a formaldehyde:phenol molar ratio of from about 1.2:1 to about 2.6:1 and an alkali hydroxide:phenol molar ratio of from about 0.5:1 to about 1.2:1, wherein the alkali is selected from the group consisting of potassium, sodium, and mixtures therof; and (b) from about 20% to about 120% by weight, based on the weight of resin solids, of a hardening agent for said resin, said hardening agent having at least one ester functional group and being capable of catalyzing cure of said resin, wherein said hardening agent has a viscosity, before mixing with (a), in the range of from about 1,000 cps to about 15,000 cps, said viscosity being increased by addition to said hardening agent of a fumed silica thickening agent in an amount of between about 1% and about 6% by weight, based on the weight of the hardening agent, wherein the paste prepared by mixing (a) and (b) has a viscosity, as mixed, in the range of about 1,000 cps to about 15,000 cps.

33. The adhesive paste of claim 32, wherein said hardening agent is selected from the group consisting of lactones, carboxylic acid esters, organic carbonates and mixtures therof.

34. The adhesive paste of claim 32, wherein said hardening agent has from 3 to 12 carbon atoms.

35. The adhesive paste of claim 32, wherein said hardening agent is selected from the group consisting of propylene carbonate, triacetin, gamma-butyrolactone, and mixtures thereof.

36. The adhesive paste of claim 32, wherein the paste prepared by mixing (a) and (b) has a viscosity, as mixed, of at least about 3,000 cps.

* * * * *